US 9,958,101 B2

(12) United States Patent
Gennasio et al.

(10) Patent No.: US 9,958,101 B2
(45) Date of Patent: May 1, 2018

(54) QUICK-FIT COUPLING FOR PRESSURIZED FLUID

(71) Applicant: ALFA GOMMA S.p.A., Vimercate (Monza Brianza) (IT)

(72) Inventors: Enrico Gennasio, Vimercate (IT); Stefano Mazzoli, Mezzago (IT); Rinaldo Doi, Merlino (IT)

(73) Assignee: ALFA GOMMA S.P.A., Vimercate (Monza Brianza) (IT)

( * ) Notice: Subject to any disclaimer, the term of this patent is extended or adjusted under 35 U.S.C. 154(b) by 0 days. days.

(21) Appl. No.: 14/782,108

(22) PCT Filed: Apr. 2, 2014

(86) PCT No.: PCT/EP2014/056626
§ 371 (c)(1),
(2) Date: Oct. 2, 2015

(87) PCT Pub. No.: WO2014/161906
PCT Pub. Date: Oct. 9, 2014

(65) Prior Publication Data
US 2016/0047504 A1 Feb. 18, 2016

(30) Foreign Application Priority Data
Nov. 4, 2015 (IT) .............................. MI2013A0524

(51) Int. Cl.
F16L 37/34 (2006.01)
F16L 37/23 (2006.01)

(52) U.S. Cl.
CPC ............... F16L 37/34 (2013.01); F16L 37/23 (2013.01)

(58) Field of Classification Search
CPC . F16L 37/28; F16L 37/30; F16L 37/32; F16L 37/34; F16L 37/35; F16L 37/23
See application file for complete search history.

(56) References Cited

U.S. PATENT DOCUMENTS 4,114,905 A * 9/1978 Mercier .................. F16L 23/18
267/167
5,123,446 A * 6/1992 Haunhorst .............. F16L 37/23
137/614

(Continued)

FOREIGN PATENT DOCUMENTS

EP 745802 A1 12/1996
GB 2166501 A 5/1986

OTHER PUBLICATIONS

International Search Report dated Apr. 23, 2014 which issued during prosecution of International Patent Application No. PCT/EP2014/056626.

Primary Examiner — Ian Paquette
(74) Attorney, Agent, or Firm — Troutman Sanders LLP

(57) ABSTRACT

A quick-fit coupling (1) for pressurized fluid, comprising a hollow longitudinal valve body (3) having at least a first valve body part (4) and a second valve body part (5) that is coaxially movable with respect to the first valve body part (4), a shutter stem (6) positioned in the valve body (3) coaxially to the longitudinal axis (L) of the valve body (3), a longitudinal hollow body (7) for containing the valve body (3), disposed coaxially to the valve body (3) and defining, with the valve body (3), a hollow space (8), a drive sleeve (9) for driving the second part (5) of the valve body (3) and disposed in the hollow space (8), the second valve body part (5) being movable with respect to first valve body part (4) in contrast and by action of a first helical spring (10) positioned in the hollow space (8), the sleeve (9) being movable with respect to the valve body (3) in contrast and by action of a second helical spring (13) positioned in the hollow space (8), at least one helical spring (10, 13) having coils with a cross section elongated in shape in the direction parallel to the axis of the helical spring.

11 Claims, 2 Drawing Sheets

(56) References Cited

U.S. PATENT DOCUMENTS

Figure 1:
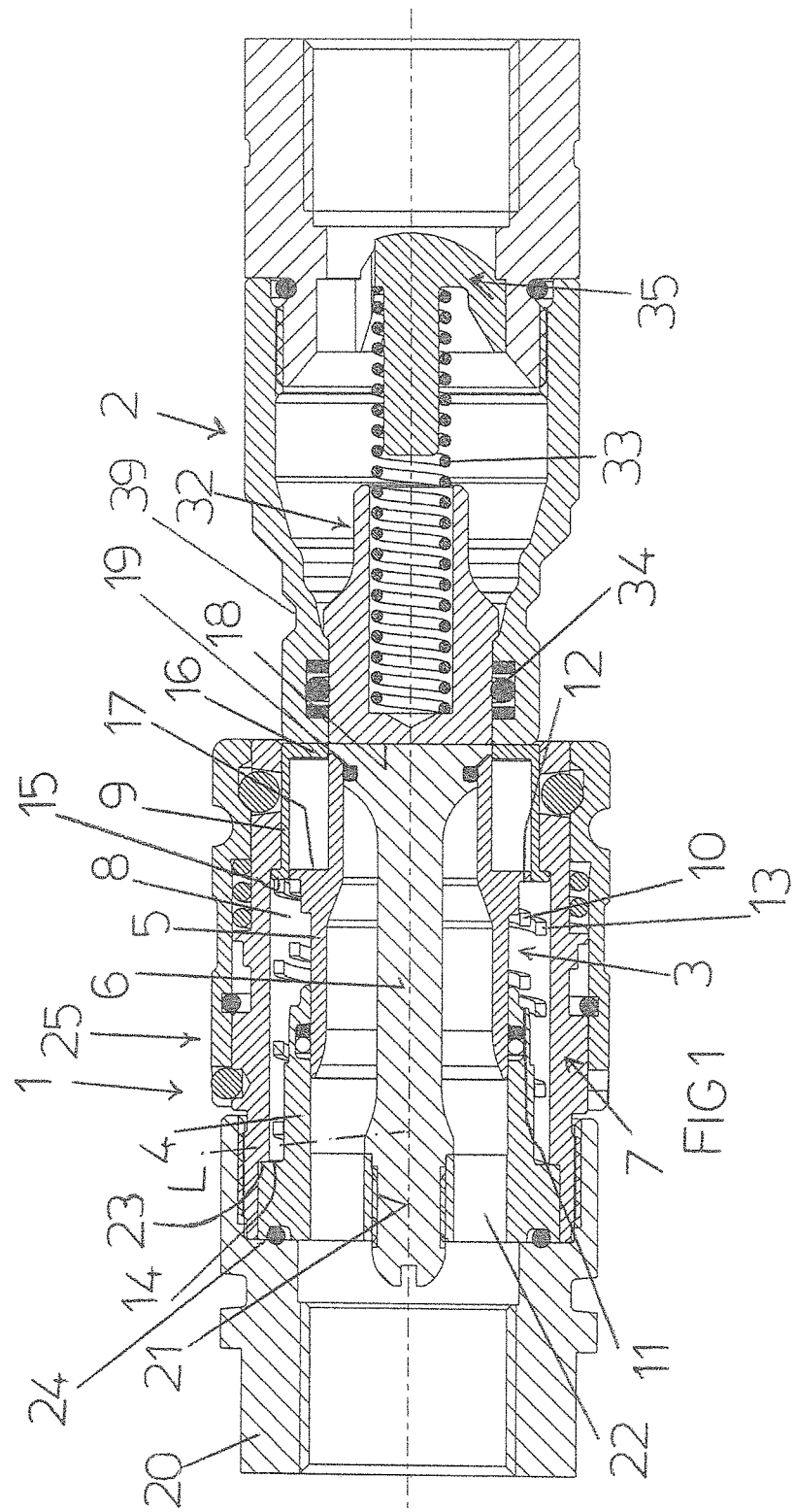

| | | | |
|---|---|---|---|
| 6,598,620 B1 | 7/2003 | Fremy | |
| 7,942,163 B2 * | 5/2011 | Sauer | F16L 29/007 137/614.03 |
| 2010/0042053 A1 | 2/2010 | Dillard, III | |
| 2015/0377402 A1 * | 12/2015 | Boothe | F16L 55/1015 251/149.7 |
| 2016/0047503 A1 * | 2/2016 | Ballard | F16L 37/34 251/149.7 |

* cited by examiner

QUICK-FIT COUPLING FOR PRESSURIZED FLUID

CROSS-REFERENCE TO RELATED APPLICATIONS

This application is the U.S. National Phase of International Patent Application Serial No. PCT/EP2014/056626, filed on Apr. 2, 2014, which claims priority to Italian Patent Application No. MI2013A000524, filed on Apr. 5, 2013, both of which are herein incorporated by reference in their entireties.

The present invention relates to a quick-fit coupling for pressurised fluids, particularly a hydraulic one, usable in agricultural and industrial applications. More in particular, reference is made to a quick-fit coupling comprising a valve body having an axial cavity in which a shutter stem is elastically induced to carry out a relative movement with respect to the valve body between a position of opening and a position of closing off an axial passage of fluid through the cavity. The quick-fit coupling can be connected with another coupling, and reciprocal locking is generally obtained by means of a locking ring borne by the female coupling.

In the disconnected condition, the coupling normally has the shutter in a position of closing off the passage, which is opened solely as a result of the connection between the couplings.

Couplings of this kind are designed to prevent the partial closing of the shutter, with an inversion of flow and occurrence of peak flow rates.

One of the problems to be confronted when designing such a quick-fit coupling is related to the optimisation of the pressure drops in the flow, which, as is well known, given an equal flow rate, decrease with increases in the internal diameter of the valve body, and increase with increases in the velocity of the fluid.

The optimisation of pressure drops must take into account both the fact that the external diameters of couplings are by now standardised and can thus not be modified, and the fact that some components, for example the stem, cannot be reduced in diameter to increase the cross section of the fluid passage, because they must ensure adequate mechanical strength to withstand the pressure loads.

The technical task that the present invention sets itself is thus to realise a quick-fit coupling for pressurised fluids which enables the aforementioned technical drawbacks of the prior art to be overcome.

Within the scope of this technical task, one object of the invention is to realise a quick-fit coupling for pressurised fluids that enables pressure drops to be minimised while maintaining the external diameters of the coupling unchanged. Within the scope of this technical task, one object of the invention is to realise a quick-fit coupling for pressurised fluids that enables pressure drops to be minimised without penalising the properties of mechanical strength of the components thereof.

The technical task, as well as these and other objects, according to the present invention, are achieved by realising a quick-fit coupling for pressurised fluid comprising a longitudinal hollow valve body having at least a first valve body part and a second valve body part that is coaxially movable with respect to first valve body part, a shutter stem positioned in the valve body, a longitudinal hollow body for containing the valve body, a drive sleeve for driving the second part of the valve body and disposed in a hollow space provided between tie valve body and the containing body, said second valve body part being movable with respect to said first valve body part in contrast to and by action of a first helical spring positioned in said hollow space, said sleeve being movable with respect to said valve body in contrast and by action of a second helical spring positioned in said hollow space, characterised in that at least one helical spring between said first and second helical springs has coils with a cross section elongated in shape in the direction parallel to the axis of the helical spring.

The special shape of the coil cross section, which has a dimension in the radial direction relative to the dimension in the axial direction, enables free space to be gained within the containing body in the radial direction and consequently offers the possibility of providing a valve body having a larger cross section for the passage of fluid.

To ensure the same rigidity as the commonly adopted helical spring with a circular cross section, it is possible simply to modify the number of coils and/or the pitch between the coils.

Other features of the present invention are defined, moreover, in the subsequent claims.

Figure 2:
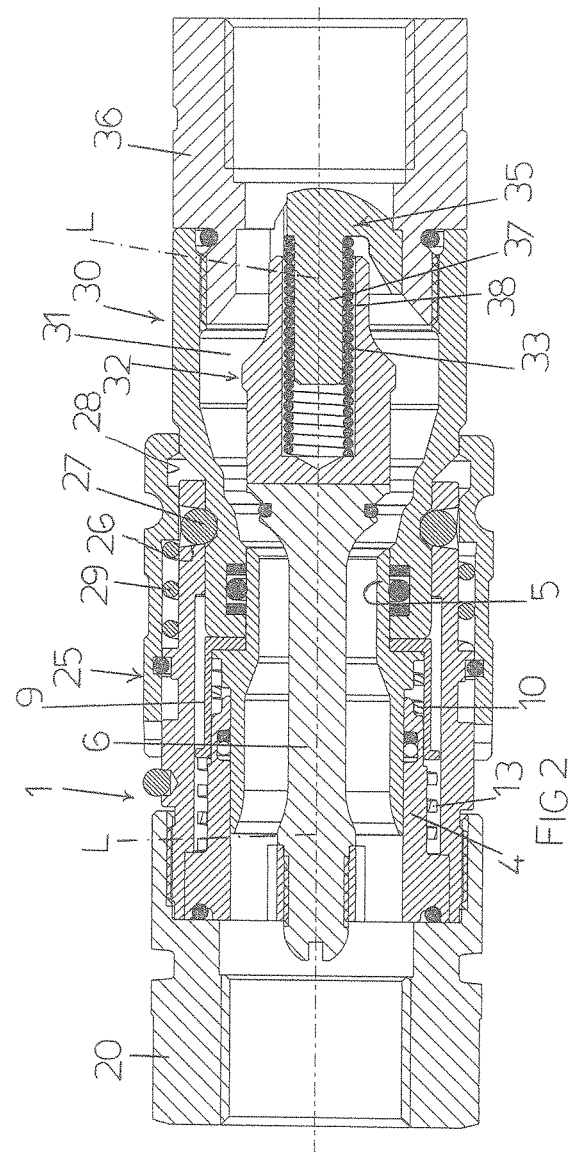

Additional features and advantages of the invention will be more apparent from the description of a preferred but non-exclusive embodiment of the quick-fit coupling according to the invention, illustrated by way of non-restrictive example in the appended drawings, in which:

FIGS. 1 and 2, respectively, show an axial section view of a female quick-fit coupling according to the invention and a male quick-fit coupling, in the disconnected and connected configuration, respectively;

With reference to the aforementioned figures, there is shown a female quick-fit hydraulic coupling 1 and a male quick-fit hydraulic coupling 2.

The female coupling 1 comprises a longitudinal hollow valve body 3 having at least a first valve body part 4 and a second valve body part 5 that is coaxially movable with respect to the first valve body part 4, and a shutter stem 6 positioned in the valve body 3 coaxially to the longitudinal axis L of the valve body 3.

A longitudinal hollow body 7 for containing the valve body 3 is disposed coaxially to the valve body 3 and defines with the valve body 3 a hollow space 8 in which a drive sleeve 9 for driving the second part 5 of the valve body 3 is disposed.

The sleeve 9 is oriented coaxially to the longitudinal axis L of the valve body 3 and has an internal flange 16 at its head end and an external flange 15 at its base end. The internal flange 16 of the sleeve 9 is engageable against a shoulder 17 of the second valve body part 5 for the driving thereof.

The second valve body part 5 is movable with respect to the first valve body part 4 in contrast and by action of a first helical spring 10 positioned in the hollow space 8 coaxially to the longitudinal axis L of the valve body 3 and interposed between the first valve body part 4 and the second valve body part 5.

More in particular, the first helical spring 10, is positioned between an external support shoulder 11 of the first valve body part 4 and an external support shoulder 12 of the second valve body part 5.

The sleeve 9 is movable with respect to the valve body 3 in contrast and by action instead of a second helical spring 13 positioned in the hollow space 8 coaxially and externally to the first helical spring 10 and interposed between the sleeve 9 and the first valve body part 4.

More in particular, the second helical spring 13 is positioned between an external support shoulder 14 of the first valve body part 4 and the external support flange 15 of the sleeve 9.

At least one and preferably both the helical springs 10, 13 advantageously have coils with a cross section elongated in shape in a direction parallel to the axis thereof.

The coils of each helical spring 10, 13 in particular have a rectangular cross section with the long side parallel to the axis of the spring itself.

Preferably, the first helical spring 10 and the second helical spring 13 have the same shape and size in terms of the cross section of their coils.

Advantageously, the support shoulders 11 and 12 have a dimension in the radial direction that is equal to the dimension in the radial direction of the cross section of the first helical spring 10, which is extremely reduced.

What is more, the internal cylindrical generatrices of the sleeve 9 substantially coincide with the external cylindrical generatrices of the first helical spring 10. This constructive solution enables the internal diameter of the valve body 3 to be widened, because it permits a reduction in the dimension of the hollow space 8 in the radial direction, to which the special configuration of the second helical spring 13, having a reduced radial dimension, also contributes.

The stem 6 has a flat head 18 and a threaded base 21 screwed into a threaded hole 22 of a support with radial partitions 22 that extend in one piece in the cavity of the first valve body part 4, from the base end of the latter.

The first valve body part 4 is locked in position by virtue of the tightening of its base end against an internal shoulder 24 of an adapter 20 screwed to an external thread of the containing body 7, and of its external shoulder 14 against an internal shoulder 23 of the containing body 7.

In the position of closing off the passage of fluid through the cavity of the valve body 3, the head 18 of the stem 6 is perimetrically in contact with the head end of the valve body 3 and ensures a hydraulic seal via a gasket 19.

In the position of opening the passage of fluid through the cavity of the valve body 3, by virtue of the relative movement between the stem 6 and the valve body 3, the head 18 is detached and positioned forward relative to the head end of the valve body 3.

The containing body 7 has a locking ring 25 for securing the connection of the female coupling 1 with the male coupling 2, and conical through seats 26, where balls 27 are freely housed.

The locking ring 25 internally has a circumferential perimeter groove 28 alignable with the conical seats 26, and can be actuated in contrast and by action of a helical spring 29 interposed between the locking ring 25 and the containing body 7.

The male coupling 2, of a known type, comprises a valve body 30 extending along a longitudinal axis L and having a cavity 31 that extends axially for the entire length of the valve body 30, and a flat head shutter stem 32 positioned in the cavity 31 coaxially to the axis L and movable with respect to the valve body 30 along the axis L, in contrast and by action of a helical spring 33, between a position of opening and a position of closing off an axial passage of fluid through the cavity 31.

In the position of closing off the passage, the head end of the stem 32 and the head end of the valve body 30 are perimetrically in hydraulic sealing contact via a gasket 34.

In the position of opening the passage, by virtue of the relative movement between the stem 32 and the valve body 30, the head end of the stem 32 is detached and positioned rearward relative to the head end of the valve body 30.

A centring and guide element 35 for the stem 32 is fastened between the valve body 30 and an adapter 36 screwed to an internal thread of the valve body 30.

The centring and guide element 36 comprises radial partitions that enable passage of the flow, and a pin 37 over which the stem 32 is fitted, with the interposition of the helical spring 33, the stem 32 being fitted with an axial cavity 38 for this purpose.

Guidance of the stem 32 is aided by valve body 30, which, at its head end, has an internal cylindrical lateral surface which is matable with an external cylindrical lateral surface of the stem 32.

The connection between the quick-fit female coupling 1 and the quick-fit male coupling 2 takes place in the following manner.

Prior to the connection, the quick-fit male coupling 2 is in a configuration in which the shutter 32 is maintained against the valve body 30 by the spring 33 so as to close off the axial passage of fluid through the valve body 30.

Prior to the connection, the female coupling 1 is in a configuration in which the spring 10 maintains the second part 5 of the valve body 3 extended against the head 18 of the shutter 6 in a position such as to close off the passage axial of fluid through the valve body 3, and in which the spring 13 maintains the sleeve 9 extended in a position flush with the head 18 of the shutter 6.

During the axial push of the operator to make the connection, the head end of the valve body 30 of the male coupling 2 comes into opposition with the internal flange 16 of the sleeve 9 of the female coupling 1 and pushes it, causing a retraction of the sleeve 9 relative to the second part 5 of the valve body 3. At a certain point during its retraction stroke, the sleeve 9 intercepts, with its internal flange 16, the external shoulder 17 of the second part 5 of the valve body 3, which in turn retracts relative to the shutter 6, thus opening the axial passage for the fluid through the valve body 3.

During the axial push of the operator to make the connection, moreover, the head end of the shutter 32 of the male coupling 2 comes into opposition with the head end 18 of the fixed shutter 6 of the female coupling 1, by which it is pushed so as to retract within the valve body 30 until opening the passage axial for the fluid through the valve body 30.

To secure the connection between the female coupling 1 and the male coupling 2 the locking ring 25 is actuated.

Initially, the groove 28 is aligned with the seats 26 in which the balls 27 are locked by virtue of the retention exerted by the sleeve 9. The balls 27 hold the locking ring 25 in position. The subsequent penetration of the male coupling 2 into the female coupling 1 causes a movement of the sleeve 9 until an external perimeter groove of the valve body 30 of the quick-fit male coupling 2 aligns itself with the seats 26. In this coupling configuration, the balls 27 project into the groove 39 and free the locking ring 25, which, by virtue of the stretching of the spring 29, extends toward the male coupling 2. The extension of the locking ring 25 causes the groove 28 to be offset from the seats 26, with the consequence that the balls 27 remain trapped in the groove 39, which they no longer have the possibility of coming out of unless the locking ring 25 is retracted to realign the groove 28 with the seats 26. The quick-fit coupling thus conceived is susceptible of numerous modifications and variants, all falling within the scope of the inventive concept; moreover, all the details may be replaced with other technically equivalent ones.

In practice, all of the materials used, as well as the dimensions, can be any whatsoever according to need and the state of the art.

The invention claimed is:

1. A quick-fit coupling for pressurized fluid, comprising:
a hollow valve body that extends along a longitudinal axis comprising:
   at least a first valve body part, and
   a second valve body part that is coaxially movable with respect to the first valve body part,
a shutter stem positioned in the hollow valve body,
a longitudinal hollow body containing the hollow valve body, and
a drive sleeve driving the second valve body part and disposed in a hollow space provided between the hollow valve body and the longitudinal hollow body,
wherein said second valve body part being movable with respect to said first valve body by action of a first helical spring positioned in said hollow space, and comprises:
   a front portion releasably engaging the shutter stem;
   an intermediate portion; and
   a rear portion comprising a radius greater than the front portion;
   wherein the intermediate portion is tapered to transition from the rear portion to the front portion,
wherein said sleeve being movable with respect to the hollow valve body by action of a second helical spring positioned in said hollow space,
wherein at least one of said first and second helical spring has coils with a rectangular cross section in the direction parallel to the axis of the other of the first and second helical spring, and
wherein the coils of the least one of said first and second helical spring comprise a rectangular height in the direction parallel to the axis greater than a rectangular width in a direction perpendicular to the height.

2. The quick-fit coupling for pressurized fluid according to claim 1, wherein said shutter stem is oriented coaxially to the hollow valve body and is solidly constrained to the first valve body part.

3. The quick-fit coupling for pressurized fluid according to claim 1, wherein said containing body and said drive sleeve are oriented coaxially to said hollow valve body.

4. The quick-fit coupling for pressurized fluid according to claim 1,
   wherein said first helical spring is oriented coaxially to the hollow valve body and is interposed between said first valve body part and said second valve body part;
   said second helical spring is oriented coaxially to the hollow valve body and is interposed between said sleeve and said first valve body part.

5. The quick-fit coupling for pressurized fluid according to claim 1, wherein said first helical spring and said second helical spring, respectively, have coils with a cross section in the direction parallel to the axis of said first helical spring and of said second helical spring, respectively.

6. The quick-fit coupling for pressurized fluid according to claim 1, wherein said second helical spring is external to said first helical spring.

7. The quick-fit coupling for pressurized fluid according to claim 1, wherein said first and second helical spring have the same shape and dimension of the cross section of the coils thereof.

8. The quick-fit coupling for pressurized fluid according to claim 1, wherein the external cylindrical generatrices of the first helical spring are substantially coincident with the internal cylindrical generatrices of the said sleeve.

9. The quick-fit coupling for pressurized fluid according to claim 1, wherein said second helical spring is positioned between an external support shoulder of said first valve body part and an external support flange of said sleeve.

10. The quick-fit coupling for pressurized fluid according to claim 1, wherein said first helical spring is positioned between an external support shoulder of said first valve body part and an external support shoulder of said second valve body part.

11. The quick-fit coupling for pressurized fluid according to claim 10, wherein said external support shoulders of the first and second valve body parts have a dimension in the radial direction equal to the dimension in the radial direction of the cross section of said first helical spring.

* * * * *

UNITED STATES PATENT AND TRADEMARK OFFICE
CERTIFICATE OF CORRECTION

PATENT NO. : 9,958,101 B2
APPLICATION NO. : 14/782108
DATED : May 1, 2018
INVENTOR(S) : Enrico Gennasio et al.

Page 1 of 1

It is certified that error appears in the above-identified patent and that said Letters Patent is hereby corrected as shown below:

On the Title Page

Item (30), delete "Nov. 4, 2015", add "Apr. 5, 2013"

Signed and Sealed this
Eighteenth Day of September, 2018

Andrei Iancu
*Director of the United States Patent and Trademark Office*